Feb. 4, 1964     D. L. BRUNTON     3,120,073
FISH LURE

Filed Feb. 2, 1961     2 Sheets-Sheet 1

DON L. BRUNTON
INVENTOR.

BY Ely Silverman
ATTORNEY

Feb. 4, 1964 D. L. BRUNTON 3,120,073
FISH LURE
Filed Feb. 2, 1961 2 Sheets-Sheet 2
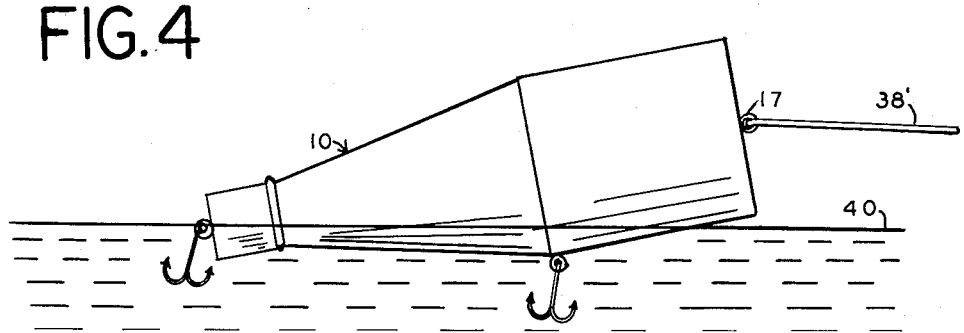
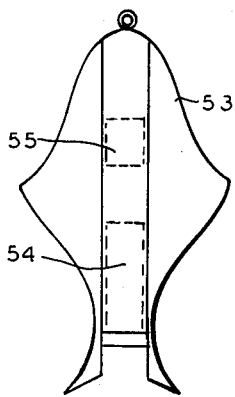
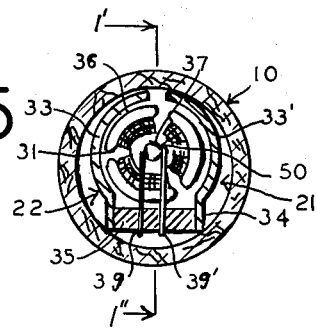
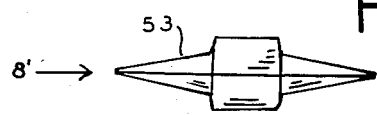
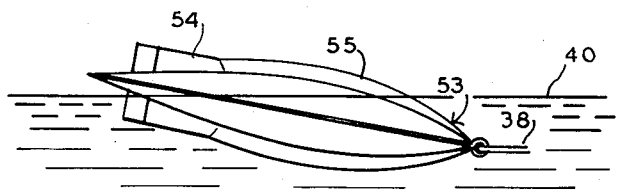
DON L. BRUNTON
*INVENTOR.*
BY
Ely Silverman
ATTORNEY

United States Patent Office 3,120,073
Patented Feb. 4, 1964

3,120,073
FISH LURE
Don L. Brunton, Amarillo, Tex., assignor of fifty-one percent to Henry Ray and forty-nine percent to Gib K. Howard, both of Amarillo, Tex.
Filed Feb. 2, 1961, Ser. No. 86,779
1 Claim. (Cl. 43—17.1)

This invention relates to a fish lure. More particularly, this invention provides a fish lure to which are attached hooks, which operates beneath the surface and yet can be recovered from the surface of the water, and which provides an audible signal which, in the operational position, is generated from within the water.

Accordingly, one object is to provide an improved fish lure.

Another object of this invention is to provide a fish lure which operates below the surface of the water and yet floats to the surface when at rest.

A further object of this invention is to provide a fish lure which generates sound when submerged, yet floats to the surface when at rest.

Still another object of this invention is to provide a fish lure with a readily controllable sound which operates at any desired depth below the surface of the water and is recoverable from the surface.

Yet another object of this invention is to provide a fish lure which may provide an audible signal below the surface of the water for a considerable length of time, being mechanically reliable and readily rechargeable.

Other objects will become more apparent from the description and drawings, which drawings form a part of this specification and wherein like numbers refer to like parts, and wherein:

FIGURE 4 is an operational view of a slightly altered embodiment of the apparatus of FIGURE 1;

FIGURE 5 is a cross-sectional view along the section 5'—5" of FIGURE 1;

FIGURE 6 is a plan view of an alternative embodiment of this invention;

FIGURE 7 is a front view of the embodiment of FIGURE 6 as seen along the arrow 7' of FIGURE 6; and FIGURE 8 is a side view of the embodiment of FIGURE 6 as seen along the arrow 8' of FIGURE 7.

Generally the device of this invention comprises a fish lure body 10, wherein is located, in operative connection, a source of electro-motive force, as battery 19 in FIGURE 1, and a source of vibration actuated thereby, as motor 22 in the below described embodiment of FIGURE 1. The entire device floats in the water, as hereinbelow described, and the motor vibrates in a plane normal to the longitudinal axis of the body to effect transmission of audible vibration to the watery medium in which said body is supported.

Figure 1:
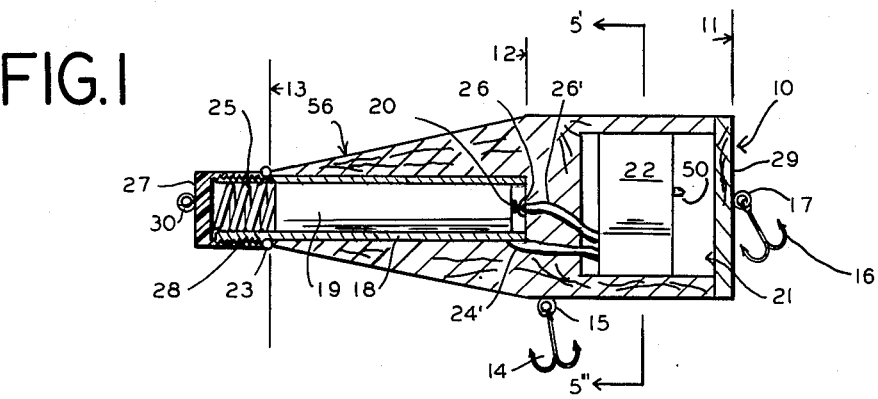
FIGURE 1 is a cross sectional view taken along line 1'—1" of FIGURE 5, in one embodiment of this invention.

Referring now to the drawings, one embodiment of the fish lure device according to this invention is shown in section in FIGURE 1. The device comprises a 4 inch long wooden body, generally shown as 10, cylindrical in outline from rear plane 11 to central plane 12 and in the form of a truncated cone from plane 12 to the front plane 13. The diameter of the body is 1¼ inches at plane 11 and about ⅝ inch at plane 12. The axes of the cylindrical and conical portions are coaxial. The distance from plane 11 to plane 12 in this particular embodiment is 1¼ inches. Standard three-prong 1 inch long hooks 14 and 16 are, respectively, suspended from eyelets 15 and 17 on the body 10. The battery is replaceable by removing the removable cap, 27.

In the embodiment of FIGURE 1, a ½ inch diameter cylindrical hollow battery chamber 18 of 2 inch length is provided in the conical section of the lure body, the longitudinal axis of said chamber being coaxial with the longitudinal axis of the said conical portion. Into this chamber is firmly fitted a ½ inch outside diameter metal tube 24. A conventional small cylindrical 1½ volt battery 19 of about 1¾ inches length and ⅜ inch outside diameter firmly fits into tube 24. The battery is arranged to run the motor 22 from about 26 to about 45 minutes. Spring 25, compressed in its operative position, completes the electrical contact from tube 24 to one terminal of battery 19. The other terminal of the battery 20 contacts head 26. Wires 26' and 24' connect the battery to motor 22. A compressive O-ring 23 is pressed against the front of the body lure 10, i.e. at plane 13, by cap 27, which cap 27 screws into threads 28 on the tube 24 to provide a water-tight container for the battery which firmly locates and positions the battery to provide firm electrical contacts with the electrical contacts provided therefor.

Motor chamber 21 is cylindrically shaped with its rear at the rear cover 29 of the body, and with its longitudinal axis coaxial with the longitudinal axis of body 10 between planes 11 and 12. Motor chamber 21 is 1¼ inches deep, in the embodiment of FIGURE 1, and 1 inch in internal diameter. The motor 22 is, overall, about 1 inch long. The motor 22 is a simple D.C. motor with a Y-shaped, 3-pole ½ inch diameter armature 31 having a circular periphery and a ¼ inch wide core 32 rotatably supported between the arms 33 and 33' of a magnetized U-shaped housing 34 which is ⅞ inch high. At the base of the housing is a permanent magnet 35: its arms 33 and 33' curve about the armature in a circle concentric with the outline of said armature and providing a 1/32 inch radial gap 36. The 3-pole armature is provided with 3 commutator segments 37, 37', and 37". Brushes 39 and 39' provide for self-starting action of this motor; the bearings are rather loose and the shaft 50 is slightly imbalanced only, as by crimping, with the shaft having more weight on one side of its axis than on the other although such additional weight is located no further from the center of that shaft than its periphery. The motor is fitted sufficiently tightly into the chamber 21 of the lure body 10 so that the vibration of the motor is transmitted quite completely to the body and, therefrom, to the water which surrounds it.

Figure 2:
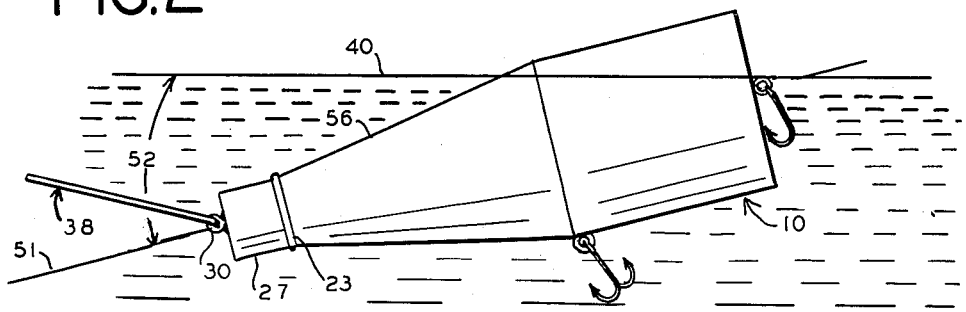
FIGURE 2 is a side elevational view of the device of FIGURE 1 in its operational floating position.

The shaft 50 is about 1/16 inch diameter and it rotatably supports the armature on the rather loose small brass bearing surfaces. The shaft is cut off so that it is in imbalance. The shaft and axis of rotation of the motor 22 is parallel to the axis of the cylindrical portion of the lure body 10. Motor 22 runs free except for this imbalance. Accordingly, the more tightly the motor fits into the housing therefor and the greater the shaft imbalance, the lower the tone of the hum will be. The motor fit is arranged to provide, in the preferred embodiment, a relatively low-pitched hum which is audible to humans and corresponds to F-sharp which is about ten notes below middle C. In the normal operation of the device, this hum is audible at 200 yards distance when the lure is on the surface of the water as shown in FIGURE 2. A rear plate 29 closes the chamber 21 and may be fastened thereto as by water insoluble glue or cement to complete the water-proof connection between the plate 29 and the plug body 10. The vibration of the motor 22 does not give any translatory motion to the lure. The lure is moved from one position to another by conventional fishing line 38. This lure may be cast as any other lure.

Figure 3:
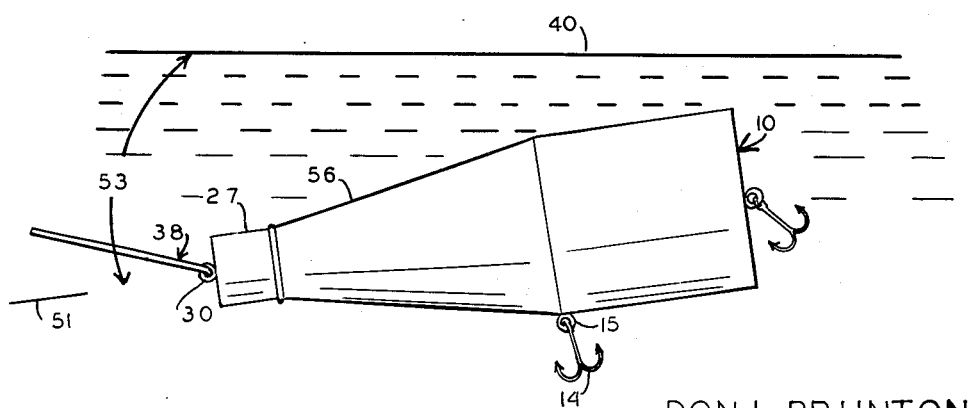
FIGURE 3 is a side view of the device of FIGURE 1 in its operational submerged position.

The device floats in the water as shown in FIGURE 2 with the major portion thereof below the water line 40. As shown in FIGURE 2, the longitudinal axis of the fish lure body 51 is at a substantial angle 52 to the surface 40 of the water. Accordingly, the sloped surface 56 of the body or housing 10 is at an angle thereto even greater and when the device 10 is pulled at eyelet 30 (on cap 27) the speed of reeling, even though slight, is sufficient to force and maintain the entire device under water about 6 to 12 inches and oriented as shown in FIGURE 3, wherein the angle 53—the angle between the longitudinal axis of the lure 51 and the horizontal—is less than angle 52 above discussed; yet this is still sufficient to maintain the device under water.

When the lure is pulled from an eyelet as 17 on reel plate 29, the device rides the surface as shown in FIGURE 4, as the center of gravity of the lure is slightly to the front of its center of volume.

Another embodiment of the apparatus according to this invention is shown in FIGURES 6–8, wherein a different fish-shaped body 53 is used. The battery chamber 54 and motor chamber 55 are similar to the body chamber 19 and motor chamber 21 above described. The same apparatus may be used therefor. The housing or body, as 10 or 53, may be made of plastic or metal, or wood, as desired, in order to effect flotation of the entire lure, including the hook or hooks attached thereto. The motor may be moved forward or backward in the housing to achieve the above-described location of the center of gravity relative to the center of volume of the lure to, accordingly, obtain the above-described slope of the longitudinal axis of the lure body with respect to the surface of the body of water in which such lure floats. The depth of submersion depends on the rate of motion of the lure parallel to the surface of the water and the angle of surface, as 56, on the embodiment of FIGURE 1 and surface 57 on the embodiment of FIGURE 6. Both of these factors may be readily controlled and/or chosen according to this invention.

According to the particular embodiments of this invention, as above described, a noisy motor is allowed to run free inside a housing to which it is firmly attached to cause said housing to vibrate in a plane normal to its longitudinal axis. Also, by this invention a device that produces sound of a controllable frequency under the surface of a body of water, yet is also readily recoverable by floating to the surface, is conveniently, reliably and inexpensively obtained.

Though I have shown and described certain embodiments of my invention, I do not wish to be limited thereto, but desire to include in the scope of my invention the constructions, combinations and arrangements substantially as set forth in the appended claim.

I claim:

An elongated fish lure comprising a housing with a front end and rear end, and a longitudinal axis elongated in the front-to-rear direction and extending between said front end and said rear end, a hook attached to and depending from the outside of said housing, means completely enclosed in said housing and fixedly attached thereto for continuously causing audible vibration of said housing in a plane normal to the length of said housing, said lure having a specific gravity less than water, the center of gravity of said lure being slightly to the front of the center of volume thereof, whereby said lure floats on a body of water with the length of said housing at an acute angle to the surface of said body of water, a normally upper surface of said housing then forming an acute angle to the surface of said body of water whereby, on motion of said lure in the direction in which said acute angle is open, the lure is entirely submerged and said audible vibration is transmitted to said body of water normal to the length of said housing, and wherein the means for creating said audible vibration comprises an electric battery as a source of electromotive force, said battery being firmly fitted into said housing, and a noisy electric motor which tightly fits into said housing and causes said housing to vibrate in a plane normal to its longitudinal axis, said motor comprising a magnet, said magnet comprising two connected arms and providing a magnetic field between said arms, an armature rotatably supported within said magnetic field on loose bearings and separated from said arms by a gap, said armature comprising a central shaft and poles radially projecting from said shaft and supported thereon, and a commutator connected to said poles and supported on said shaft, said armature having more weight on one side of its longitudinal axis than on the other, said additional weight being located no further from the center of said shaft than its periphery, said armature being electrically connected to said source of electromotive force, whereby said source of electromotive force impresses an electromotive force on said armature, and said armature runs free in said electromagnetic field, and wherein the armature has an axis of rotation parallel to the said longitudinal axis of said housing.

References Cited in the file of this patent

UNITED STATES PATENTS

| | | |
|---|---|---|
| 726,020 | Bryan | Apr. 21, 1903 |
| 978,872 | Freer | Dec. 20, 1910 |
| 1,086,256 | Wilber et al. | Dec. 3, 1914 |
| 2,103,222 | Nelson | Dec. 21, 1937 |
| 2,608,612 | Merola | Aug. 26, 1952 |
| 2,784,399 | Smith | Mar. 5, 1957 |